(12) United States Patent
Li et al.

(10) Patent No.: US 12,267,520 B2
(45) Date of Patent: Apr. 1, 2025

(54) METHOD, ELECTRONIC DEVICE, STORAGE MEDIUM, AND RECORDING MEDIUM FOR IMAGE ENCODING

(71) Applicants: Beijing Bytedance Network Technology Co., Ltd., Beijing (CN); Bytedance Inc., Los Angeles, CA (US)

(72) Inventors: Xueqing Li, Beijing (CN); Li Zhang, Los Angeles, CA (US); Yuwen He, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 22 days.

(21) Appl. No.: 18/280,000

(22) PCT Filed: Mar. 2, 2022

(86) PCT No.: PCT/CN2022/078877
§ 371 (c)(1),
(2) Date: Sep. 1, 2023

(87) PCT Pub. No.: WO2022/184110
PCT Pub. Date: Sep. 9, 2022

(65) Prior Publication Data
US 2024/0146949 A1     May 2, 2024

(30) Foreign Application Priority Data
Mar. 2, 2021    (WO) ................ PCT/CN2021/078730

(51) Int. Cl.
H04N 7/12     (2006.01)
H04N 19/139    (2014.01)
(Continued)

(52) U.S. Cl.
CPC ......... *H04N 19/513* (2014.11); *H04N 19/139* (2014.11); *H04N 19/467* (2014.11); *H04N 21/4402* (2013.01)

(58) Field of Classification Search
CPC .................................................... H04N 19/467
See application file for complete search history.

(56) References Cited

U.S. PATENT DOCUMENTS 6,621,866 B1     9/2003   Florencio et al.

FOREIGN PATENT DOCUMENTS

CN     108769828 A     11/2018
CN     111225211 A     6/2020
(Continued)

OTHER PUBLICATIONS

International Search Report in PCT/CN2022/078877, mailed May 19, 2022, 3 pages.

*Primary Examiner* — Y Lee
(74) *Attorney, Agent, or Firm* — Astute IP Law Group

(57) ABSTRACT

A method, device, and storage/recording medium for image encoding, including: obtaining first coding information for a first coding unit, in a first image, indicating a scheme for encoding the first coding unit into a first bitstream of the first image; determining, based on a relative position relationship between a target region in a second image obtained from the first image and a second coding unit in the second image, a reuse mode for the second coding unit regarding the first coding information, the second coding unit corresponding to the first coding unit, the target region indicating a region in the second image different from the first image; determining second coding information for the second coding unit based on the reuse mode; and generating a second bitstream for the second image based on the second coding information.

(Continued)

Thereby, reducing computational complexity of transcoding and avoiding degradation of coding performance/quality.

20 Claims, 12 Drawing Sheets

(51) Int. Cl.
*H04N 19/467* (2014.01)
*H04N 19/513* (2014.01)
*H04N 21/4402* (2011.01)

(56) References Cited

FOREIGN PATENT DOCUMENTS

| | | | |
|---|---|---|---|
| CN | 111225277 | A | 6/2020 |
| CN | 111787319 | A | 10/2020 |

METHOD, ELECTRONIC DEVICE, STORAGE MEDIUM, AND RECORDING MEDIUM FOR IMAGE ENCODING

FIELD

This is a national stage application filed under 37 U.S.C. 371 of International Patent Application No. PCT/CN2022/078877, filed Mar. 2, 2022, which claims priority to International Patent Application No. PCT/CN2021/078730, filed on Mar. 2, 2021, the disclosures of which are incorporated herein by reference in their entireties. The present disclosure generally relates to the field of computer, and more specifically, to method, electronic device, storage medium, and recording medium for image encoding.

BACKGROUND

With the popularization of short video applications, many users download short videos on short video platforms every day and share them to other social platforms. In order to protect the copyright of short video creators and the rights and interests of short video companies, it is necessary to add a watermark to the short video bitstream downloaded by users to identify the creator's information and the company's copyright information related watermark(s). However, conventional video transcoding for watermark insertion usually has high computational complexity, and the transcoding may also lead to a decrease in video image quality.

SUMMARY

Embodiments of the present disclosure provide a solution for image encoding.

According to a first aspect of the present disclosure, a method for image encoding is proposed. The method comprises: obtaining first coding information for a first coding unit in a first image, the first coding information indicating a scheme for encoding the first coding unit into a first bitstream of the first image; determining, based on a relative position relationship between a target region in a second image obtained from the first image and a second coding unit in the second image, a reuse mode for the second coding unit regarding the first coding information, the second coding unit corresponding to the first coding unit, the target region indicating a region in the second image that is different from the first image; determining second coding information for the second coding unit based on the reuse mode; and generating a second bitstream for the second image based on the second coding information.

According to the method of the embodiments of the present disclosure, when transcoding a locally edited image, the reuse mode for the coding unit regarding the original coding information is determined based on the relative position relationship between the coding unit and the edited region, thereby the edited image is encoded based on the reuse of the original coding information. In this way, compared with the known conventional methods, the computational complexity of transcoding can be effectively reduced and a degradation of coding performance and coding quality can be avoided.

According to a second aspect of the present disclosure, an electronic device is proposed. The electronic device comprises: a processor; and a memory coupled to the processor and having instructions stored thereon which, when executed by the processor, cause the electronic device to perform a method in accordance with the first aspect of the present disclosure.

According to a third aspect of the present disclosure, a non-transitory computer-readable storage medium storing instructions is proposed. The instructions cause a processor to perform a method in accordance with the first aspect of the present disclosure.

According to a fourth aspect of the present disclosure, a non-transitory computer-readable recording medium storing a bitstream of a video is proposed. The bitstream of the video is generated by a method in accordance with the first aspect of the present disclosure, wherein the method is performed by a video processing apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 4A illustrates an image to which only a watermark is inserted, and FIG. 4B illustrates an image to which a watermark is inserted and a gray mask is added;

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
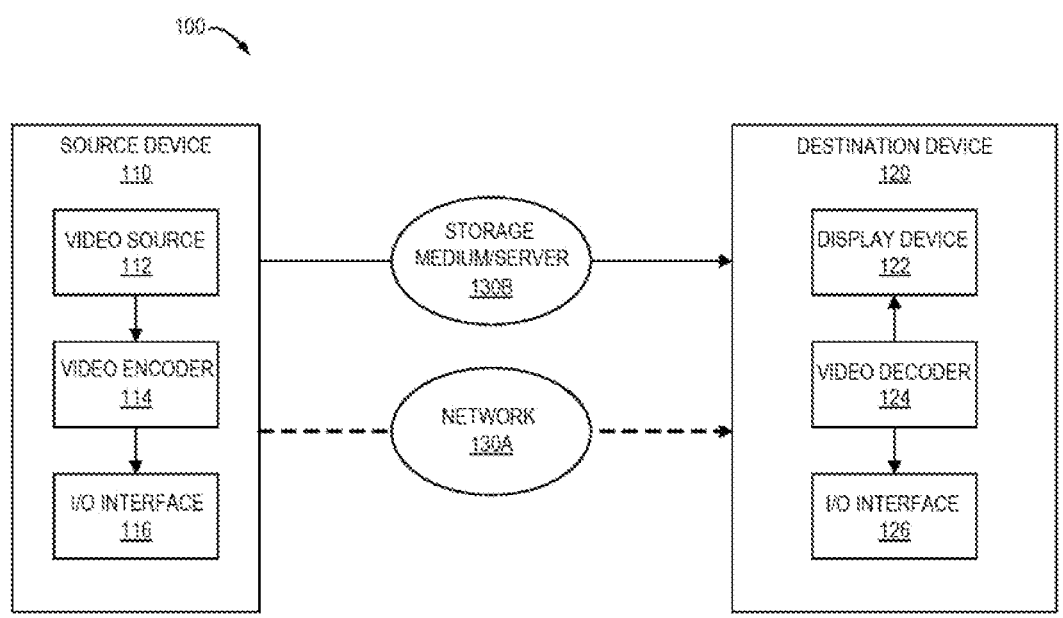
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire-encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
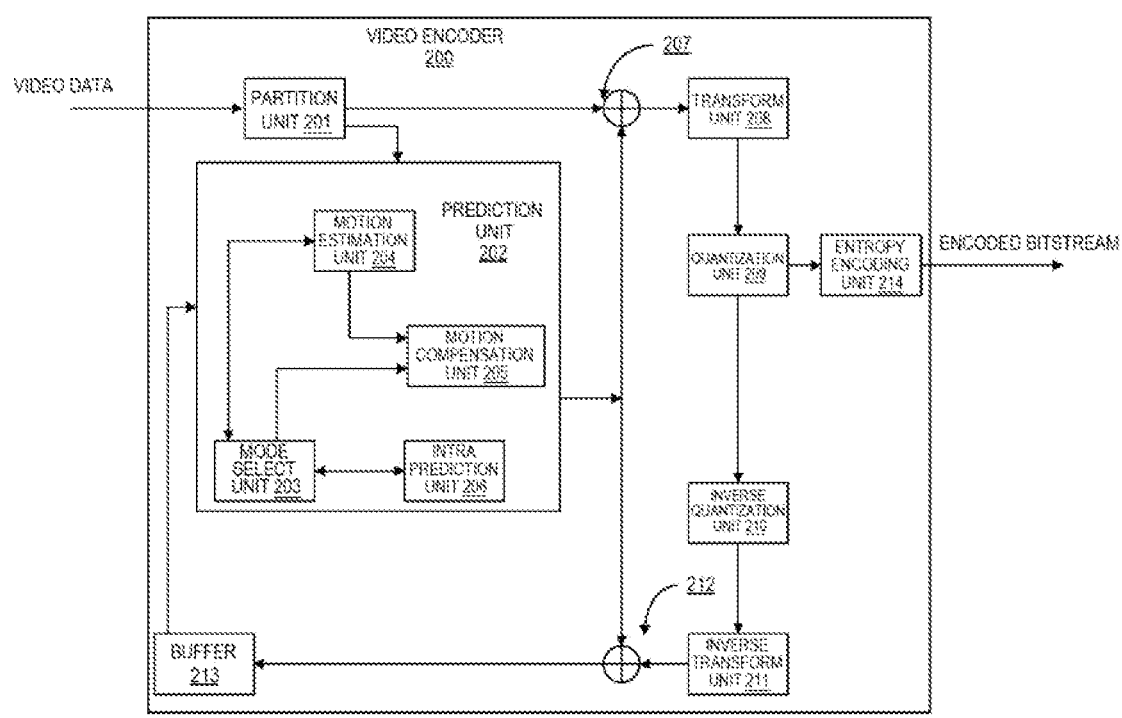
FIG. 2 illustrates a block diagram that illustrates a first example video encoder, in accordance with some embodiments of the present disclosure.

FIG. 2 is a block diagram illustrating an example of video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a prediction unit 202, a residual generation unit 207, a transform unit 208, a quantization unit 209, an inverse quantization unit 210, an inverse transform unit 211, a reconstruction unit 212, a buffer 213, and an entropy encoding unit 214. The prediction unit 202 may include a mode select unit 203, a motion estimation unit 204, a motion compensation unit 205 and an intra-prediction unit 206.

In other examples, the video encoder 200 may include more, fewer, or different functional components. In an example, the prediction unit 202 may include an intra block copy (IBC) unit. The IBC unit may perform prediction in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter prediction (CIIP) mode in which the prediction is based on an inter prediction signal and an intra prediction signal. The mode select unit 203 may also select a resolution for a motion vector (e.g., a sub-pixel or integer pixel precision) for the block in the case of inter-prediction.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the prediction unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
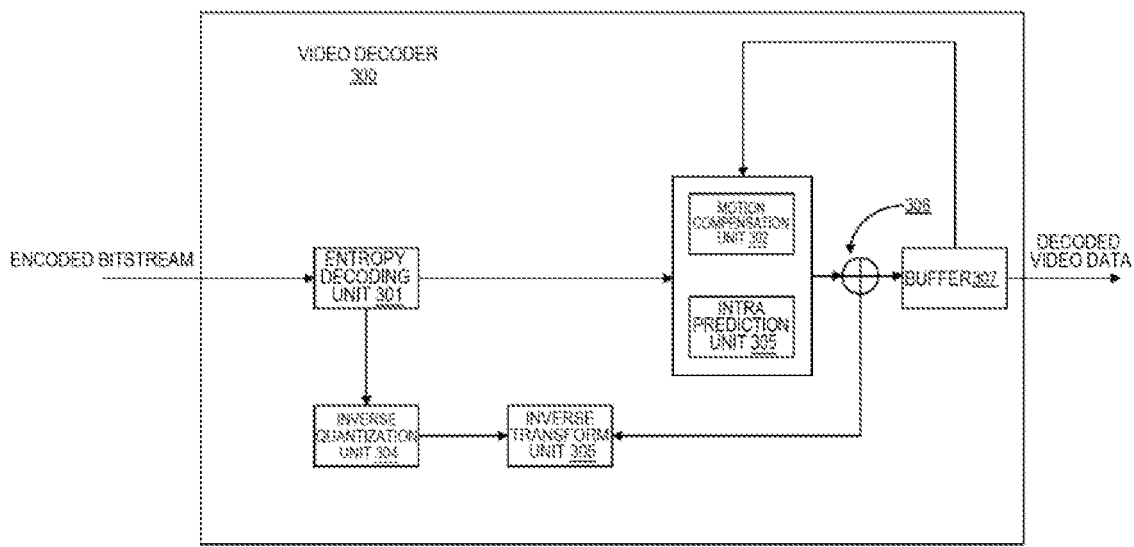
FIG. 3 illustrates a block diagram that illustrates an example video decoder, in accordance with some embodiments of the present disclosure.

FIG. 3 is a block diagram illustrating an example of video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The Entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by video encoder 20 during encoding of the video block to calculate interpolated values for sub-integer pixels of a reference block. The motion compensation unit 302 may determine the interpolation filters used by video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 303 inverse quantizes, i.e., de-quantizes, the quantized video block coefficients provided in the bitstream and decoded by entropy decoding unit 301. Inverse transform unit 303 applies an inverse transform.

The reconstruction unit 306 may obtain the decoded blocks, e.g., by sum the residual blocks with the corresponding prediction blocks generated by motion compensation unit 202 or intra-prediction unit 303. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

a. Summary

Figure 4A:
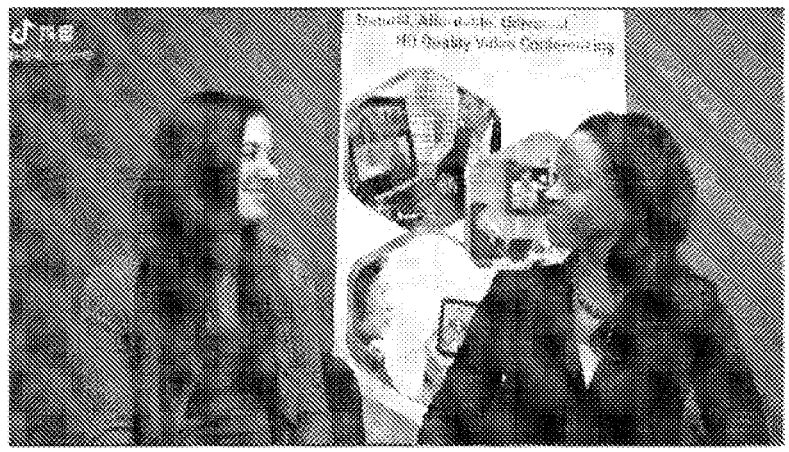
FIGS. 4A and 4B illustrate a comparative schematic diagram of adding a gray mask to a video, where
Figure 4B:

With the popularization of short video applications, many users download short videos on short video platforms every day and share them to other social platforms. In order to protect the copyright of short video creators and the rights and interests of short video companies, it is necessary to add a watermark to the short video bitstream downloaded by users to identify the creator's information and the company's copyright information related watermark(s). In addition, in order to highlight the watermark, a filtering operation is performed on the video before inserting the watermark. A layer of non-uniform varied gray mask is added visually, such as darkening the background in the watermark region, making the watermark itself more prominent. As shown in FIG. 4B, the brightness of the image gradually decreases from the middle to the top and bottom edges.

Figure 5:
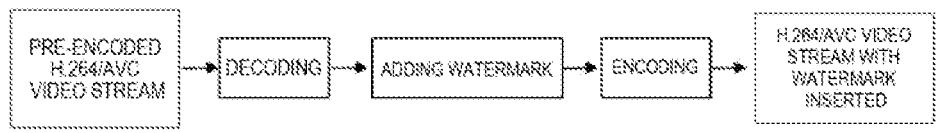
FIG. 5 illustrates a schematic diagram of the conventional process of inserting a watermark.

In the conventional watermark insertion transcoding scheme, the original bitstream is decoded at first to obtain a video image (YUV), then a watermark is inserted into the decoded video image, and finally the video image is re-encoded to obtain a watermarked bitstream. The process is shown in FIG. 5. This scheme requires re-encoding the video image after adding watermarks. On the one hand, due to the need for re-encoding, the computational complexity is high. On the other hand, due to the fact that only the decoded reconstructed video image is available, and the original video image is not available, there is no good quality reference during the re-encoding process. Therefore, it is possible to treat the noise generated during the encoding of the original bitstream as the information to be encoded during the re-encoding process, which results in a decrease in encoding efficiency (such as an increase in bitrate) during transcoding. To solve the problem of transcoding in case of watermark insertion, a series of studies and explorations have been conducted.

Figure 6:
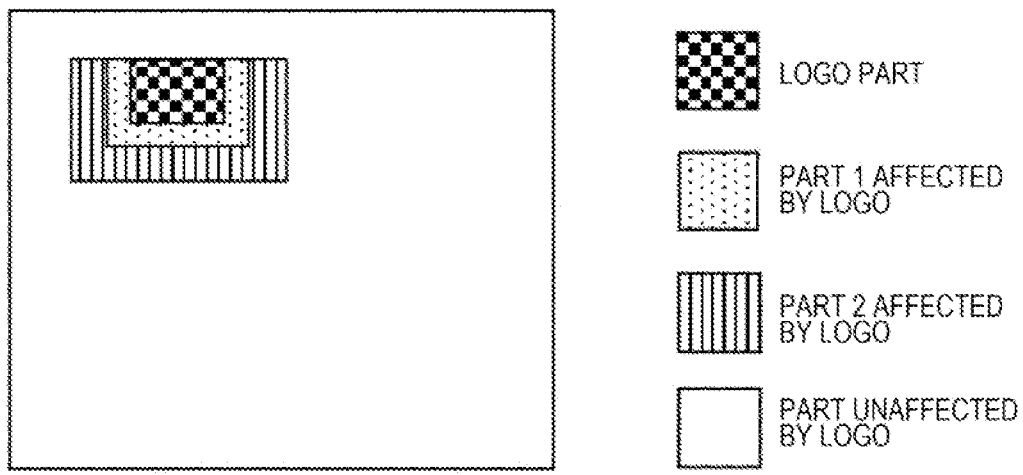
FIG. 6 illustrates a schematic diagram of a conventional partition of logo insertion.
Figure 7:
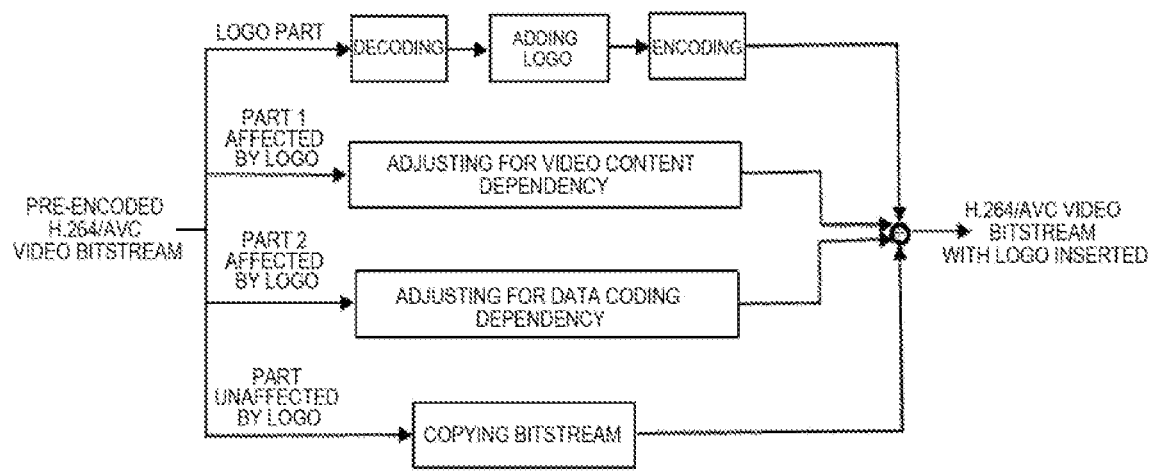
FIG. 7 illustrates a schematic diagram of a conventional transcoding of logo insertion.
Figure 8:
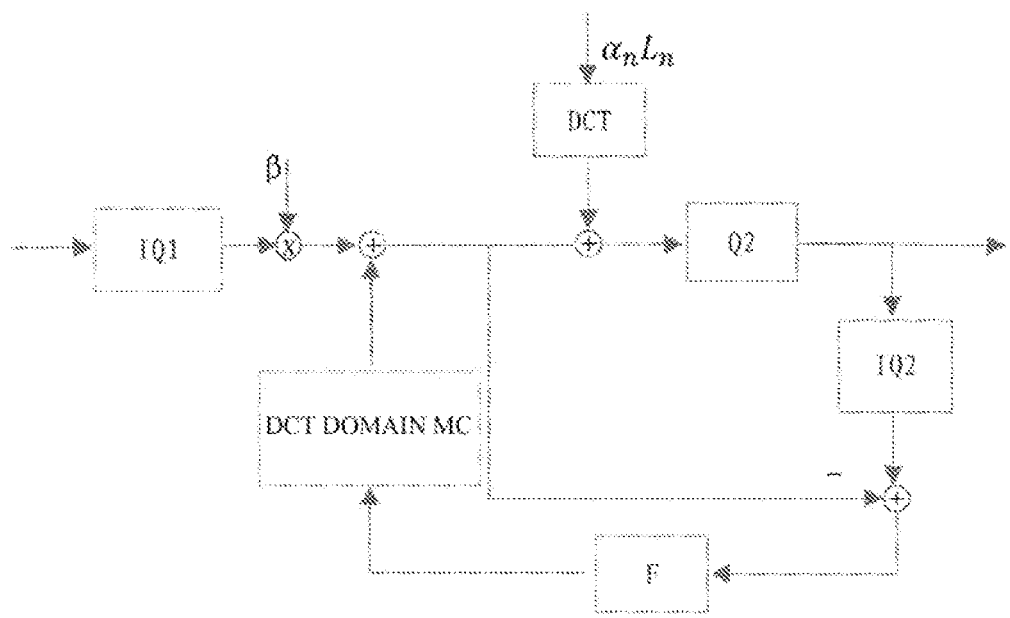
FIG. 8 illustrates a schematic diagram of a conventional fast transcoding of watermark insertion in a discrete cosine transform (DCT) domain.
Figure 9:
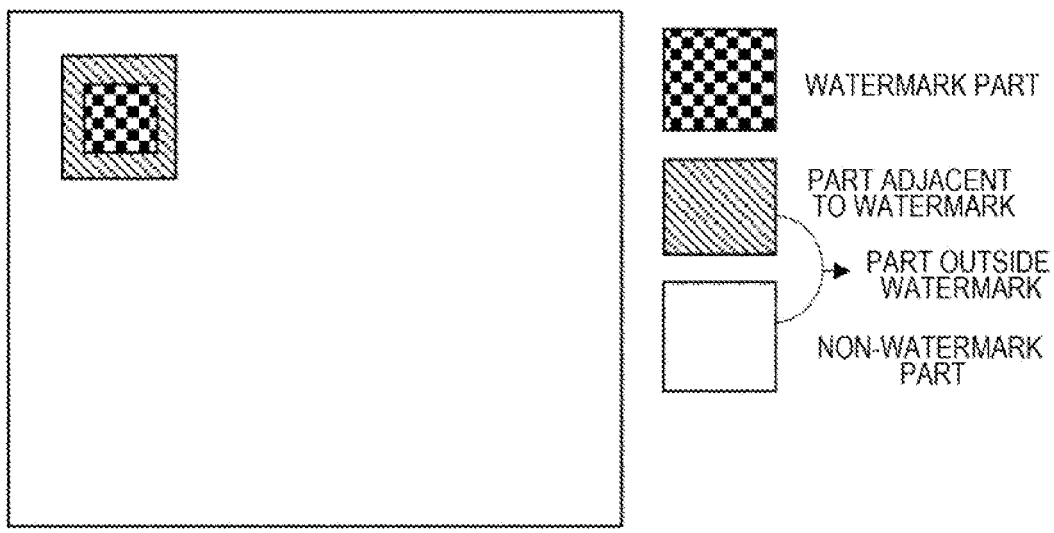
FIG. 9 illustrates a schematic diagram of watermark insertion according to some embodiments of the present disclosure.

In a conventional transcoding scheme, changes to the original compressed video are minimized. This scheme mainly comprises four steps, as shown in FIG. 6.

First Step: the logo part is decoded and then encoded by using H.264.

Second Step: a part 1 affected by the logo refers to a region directly affected by the content of the logo region. Considering that the introduction of the logo changes the content of the logo part, if the information of the original bitstream is directly reused for the part 1 affected by the logo, there will be changes in the screen content. The solution is to use lossless encoding for intra slice(s) and re-encode inter slice(s), so as to ensure that the screen content is not affected by the logo part.

Third Step: a part 2 affected by the logo refers to a region affected by encoding dependency. Since a motion vector (MV) of the part 1 affected by the logo is changed compared with the MV in the original bitstream, the MV of the part 2 affected by the logo needs to be re-encoded to be the same as the MV in the original stream, so as to ensure that a part unaffected by the logo will not be affected.

Fourth Step: the original bitstream is directly copied for the part unaffected by the logo.

The disadvantages of this scheme are also mentioned in the original text: if the entropy coding scheme of the bitstream is context-based adaptive binary arithmetic coding (CABAC), the operation of copying the bitstream in the fourth step is not feasible. In addition, for a video processed with gray mask, this scheme is not feasible because the video image that needs to be transcoded has already been changed completely, rather than only the logo region being changed.

In a conventional transcoding scheme, the input raw bitstream is partially decoded to the inverse quantization part to obtain data in a DCT domain. This data in the DCT domain is superimposed with data obtained by performing DCT on the logo, and then subsequent encoding work is carried out. Since the transcoding is performed in the DCT domain throughout this scheme, there are two aspects which may lead to error propagation. One of these two aspects is the inter prediction MC operation in the DCT domain. The motion compensation (MC) in the DCT domain and the MC operation in the pixel domain may not be exactly the same, there will be errors, and the entire prediction error will be propagated due to the inter prediction. Another aspect is the in-loop filtering in the encoding, such as deblocking. The filtering operations in the DCT domain and pixel domain may also not be exactly the same, so filtering in the DCT domain will generate errors and the errors will propagate. This scheme is not suitable for scenarios with high quality requirements.

II. Problems with Conventional Solutions

The above-mentioned intelligent transcoding scheme can effectively reduce the computational complexity of transcoding in certain situations, but there are still several problems:
1. The method of copying the bitstream for a region without watermark will inevitably introduce errors and the errors will propagate under the CABAC entropy encoding.
2. The method of copying the bitstream for a region without watermark is not applicable to a video processed with gray mask.
3. DCT domain transcoding may generate errors and the errors will propagate, which leads to a decrease in coding performance and subjective quality.

III. Embodiments of the Present Disclosure

The embodiments of the present disclosure described in detail below should be considered as examples to explain general concepts. These embodiments should not be interpreted in a narrow sense. Furthermore, these embodiments can be combined in any manner.

The embodiments of the present disclosure propose a fast transcoding method for situations where local or global adjustments (such as adding watermark locally or adding grayscale information) are required for the input image during the transcoding process.

In some embodiments, a position-based coding information reuse mode decision algorithm is proposed. The coding information reuse mode includes at least one of the following:
1) Mode #1: Full reuse mode (all coding information of a block is reused);
2) Mode #2: Partial reuse mode (a part of coding information of a block is reused, and some information can be flexibly changed);
3) Mode #3: Full non-reuse mode (coding information is required to be decided again).
1. For each coding unit (such as each macro block, each coding unit/coding block/prediction unit/prediction block/transform unit/transform block), the reuse mode of its coding information is determined based on its position.
   a. Furthermore, its motion information is utilized to comprehensively determine the reuse mode of its coding information.
2. For Mode #2, the reused information may comprise: a prediction mode (such as intra prediction or inter prediction), a coding mode (such as skip/merge/advanced motion vector prediction (AMVP)/intra/intra block copy (IBC)), a block partition, motion information (such as reference frame, motion vector, etc.), a quantization parameter a. Furthermore, non-reusable information may comprise residual information
3. For Mode #2, the reused information may comprise: prediction mode (such as intra prediction or inter prediction), a part of coding modes (such as intra/IBC), block partition, a quantization parameter
   a. Furthermore, non-reusable information may comprise motion information, a skip mode, and residual information i. For example, if it is the skip mode, a new decision needs to be made on whether to switch to a direct mode
ii. For example, if it is the skip mode, a new decision needs to be made on whether to switch to a merge mode
iii. For example, if it is the skip mode, a new decision needs to be made on whether to switch to an AMVP mode
  1. Furthermore, motion information (such as an AMVP candidate index, a motion vector difference (MVD)) etc. need to be decided again
iv. For example, if all coefficients of a residual block are zero coefficients (such as CBF=0), it is necessary to decide the residual coefficients again, including the setting of the coding block flag (CBF).
4. For Mode #2, the reused information may comprise: a prediction mode (such as intra prediction or inter prediction), a part of coding modes (such as intra/IBC, etc.), motion vector information, a block partition, a quantization parameter
  a. Furthermore, non-reusable information may comprise MVD.
    i. For example, if a skip/direct mode is used for the current coding unit, it will be switched to an AMVP mode, and MVD will be changed to be a result of subtracting the motion vector prediction value (MVP) from its motion vector information.
5. If the motion information of the current coding unit points to a locally modified region (such as the region where watermark is added), the above-mentioned method corresponding to Mode #2 will take effect.
  i. For example, if a predicted position of any pixel (such as the positions of four corners) in the current coding unit falls into the locally modified region, the above-mentioned method will take effect.
  ii. For example, if predicted positions of M pixels (such as the positions of the four corners) in the current coding unit fall into the locally modified region, and predicted positions of N pixels are outside the locally modified region, then the above-mentioned method will take effect.
6. If the current coding unit is adjacent to the locally modified region (such as the region where watermark is added) and the intra prediction mode is used for the current coding unit, the above-mentioned method corresponding to Mode #2 will take effect.
7. For mode #3, all coding information needs to be decided again.
  a. Furthermore, if the current coding unit is in the locally modified region, the above-mentioned full non-reuse method takes effect
  b. Furthermore, if a predicted position of any pixel (such as the positions of four corners) in the current coding unit falls into the locally modified region, the above-mentioned method will take effect.
  c. Furthermore, if predicted positions of M pixels (such as the positions of the four corners) in the current coding unit fall into the locally modified region, and predicted positions of N pixels are outside the locally modified region, then the above-mentioned method will take effect.

IV. Implementation Cases

Figure 10:
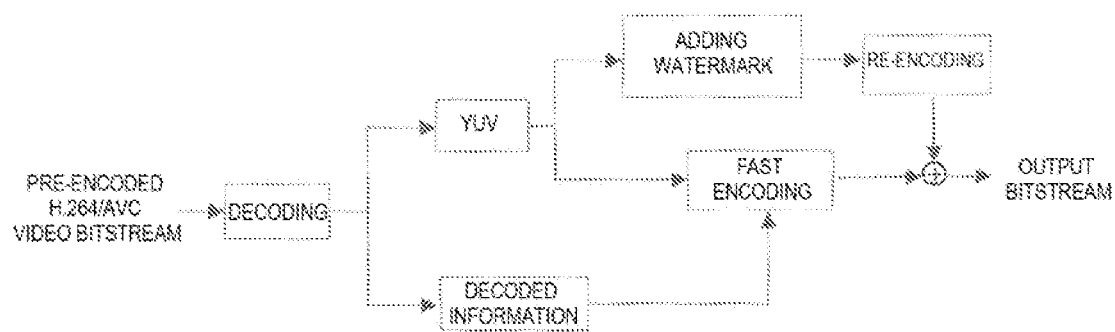
FIG. 10 illustrates a flowchart of fast transcoding of watermark insertion according to some embodiments of the present disclosure.

Considering that the content of an image in the watermark region changes after the watermark is added, and the video content in other regions remains consistent with the original video, the embodiments of the present disclosure propose a fast transcoding scheme based on decoded information reuse. The scheme is mainly divided into three parts: (1) decoding the input original 264 bitstream to obtain reconstructed video images and coding information; (2) reencoding the watermark region; (3) directly reusing, for the region outside the watermark, the macroblock (MB) division, the MB mode, the intra prediction mode, the reference frame, the MV, the quantization parameter (QP), the CBF, etc. in the decoded information, as shown in FIG. 10.

The embodiments of the present disclosure propose two fast transcoding schemes, one for transcoding with only watermark being inserted and the other one for transcoding with watermark being inserted and mask being added.

Method 1: A scheme for transcoding with only watermark being inserted
  1. Decoding a bitstream encoded according to H.264 and extracting coding information during the decoding process, the coding information comprising:
    a. a frame type, I/B/P, of each frame and whether it is an instantaneous decoding refresh (IDR) frame.
    b. QP(s) for each frame;
    c. direct_spatial_mv_pred of each inter frame;
    d. a weighted prediction mode and related coefficients for each inter frame.
    e. a prediction type of each MB (intra prediction/inter prediction);
    f. a partition scheme for each MB
    g. QP(s) for each MB;
    h. a CBF for each MB;
    i. an intra mode for each MB of intra prediction type and its sub_MB;
    j. a mode (skip/direct/inter), a reference frame and motion information (MV) for each MB of inter prediction type and its sub_MB.

The decoding is completed to obtain the video image YUV, and for each frame of the video image, a watermark is superimposed on the image according to a specified position to obtain a modified image YUV_watermark, and the position information of the watermark in the current image is recorded.
  2. Transcode encoding is performed on the YUV_watermark. The data extracted in step 1 is reused, and some highly complex computation processes are skipped. Each frame is encoded according to the following steps:
    a. Skipping a decision-making process for frame type and reusing the frame type of the corresponding frame extracted during the decoding process.
    b. Skipping a frame-level rate control and reusing the QP of the corresponding frame extracted during the decoding process.
    c. For an inter frame, skipping a decision of direct_spatial_mv_pred, and reusing the direct_spatial_mv_pred of the corresponding frame extracted during the decoding process.
    d. For an inter frame, reusing the weighted prediction mode and related coefficients of the corresponding frame extracted during the decoding process, and generating the corresponding reference frame based thereon.
    e. Then, encoding MB according to the following steps for each MB:
      i. If the MB is an MB of the watermark region, it is handed over to the encoder for normal encoding.

ii. If the MB is an MB in a non-watermark region, the processing steps are:
  1. Skipping a decision of a type of the MB, and reusing the type (Intra/Inter) of the corresponding MB extracted during the decoding process.
  2. Skipping the MB-level rate control, and reusing the QP of the corresponding MB extracted during the decoding process.
  3. Skipping a decision of a quadtree partition of MB, and reusing the partition scheme and type (Intra/Inter) of the corresponding MB extracted during the decoding process.
  4. Skipping a decision of intra mode for intra MB and its sub_MB, and reusing the intra mode of sub_MB of the corresponding MB extracted during the decoding process.
  5. Skipping a decision of a mode for inter MB and reusing the mode of the corresponding MB extracted during the decoding process.
  6. Skipping a decision for selecting a reference frame for inter MB and reusing the reference frame of the corresponding MB extracted during the decoding process.
  7. Skipping an MV searching process for inter MB and its sub_MB, and reusing the MV of the corresponding MB and its sub_MB extracted during the decoding process.
  8. If the MB is an inter block and the CBF is 0, it is necessary to determine whether the MV of this MB points to the watermark region. If the MV points to the watermark region, encoding the residual of the MB; otherwise, skipping the calculation of the CBF of this MB and reusing the CBF of the corresponding MB extracted during the decoding process.

iii. If the MB is an MB in a region adjacent to the watermark, the MB is processed according to the following steps:
  1. Skipping a decision of a type of the MB, and reusing the type (Intra/Inter) of the corresponding MB extracted during the decoding process.
  2. Skipping an MB-level rate control, and reusing the QP of the corresponding MB extracted during the decoding process.
  3. Skipping a decision of a quadtree partition of MB, and reusing the partition scheme and type (Intra/Inter) of the corresponding MB extracted during the decoding process.
  4. Skipping a decision of intra mode for intra MB and its sub_MB, and reusing the intra mode of sub_MB of the corresponding MB extracted during the decoding process. Note that the pixel values in the watermark region are different from the YUV obtained by decoding the original bitstream. If the MB in a region adjacent to the watermark may use a pixel in the watermark region for intra prediction, if CBF is reused at this time, this may lead to mosaic phenomenon, so CBF is not reused.
  5. Reencoding the watermark region will result in a difference between the MVP in an adjacent part of the watermark and the MVP in the original bitstream. If the encoding of the region is a skip mode or a direct mode, reusing this mode will cause aliasing, and the inconsistency of the MVP will propagate. To this end, in some embodiments of this disclosure, the skip mode and the direct mode are uniformly processed according to the inter mode, and CBF is not reused.
  6. Skipping a decision for selecting a reference frame for inter MB and reusing the reference frame of the corresponding MB extracted during the decoding process.
  7. Skipping an MV searching process for inter MB and its sub_MB, and reusing the MV of the corresponding MB and its sub_MB extracted during the decoding process.

3. In order to improve encoding efficiency, if an MB is previously encoded by using inter prediction and referring to the watermark region, the optimal prediction type may be selected for re-encoding through small region motion estimation and a comparison with intra prediction. if an MB is previously encoded by using intra prediction and referring to the watermark region, the intra prediction mode may be reselected and the encoding is performed. The optimal mode selection method is to minimize the rate distortion cost. Entropy encoding is performed, and watermarked H.264 bitstream is generated. The entropy encoding scheme may be selected voluntarily from context-adaptive variable-length coding (CAVLC)/CABAC.

Method 2: A scheme for transcoding with watermark+gray mask being inserted
  1. Decoding a bitstream of a video pre-encoded according to H.264 and extracting coding information during the decoding process, the coding information comprising:
    a. a frame type, I/B/P, of each frame and whether it is an instantaneous decoding refresh (IDR) frame.
    b. QP(s) for each frame;
    c. direct_spatial_mv_pred of each inter frame;
    d. a weighted prediction mode and related coefficients for each inter frame.
    e. a prediction type of each MB (intra prediction/inter prediction);
    f. a partition scheme for each MB
    g. QP(s) for each MB;
    h. a CBF for each MB;
    i. an intra mode for each MB of intra prediction type and its sub_MB;
    j. a mode (skip/direct/inter), a reference frame and MV for each MB of inter prediction type and its sub_MB.
  The decoding is completed to obtain YUV, and for each frame of the YUV, a watermark is superimposed on the YUV to obtain YUV_watermark and the position information of the watermark on the YUV is recorded.
  2. H.264 transcode encoding is performed on the YUV_watermark. The coding information extracted in step 1 is reused, and some computation processes are skipped. Each frame is encoded according to the following steps:
    a. Skipping a decision-making process for frame type and reusing the frame type of the corresponding frame extracted during the decoding process.
    b. Skipping a frame-level rate control and reusing the QP of the corresponding frame extracted during the decoding process.
    c. For an inter frame, skipping a decision of direct_spatial_mv_pred, and reusing the direct_spatial_mv_pred of the corresponding frame extracted during the decoding process.
    d. For an inter frame, reusing the weighted prediction mode and related coefficients of the corresponding frame extracted during the decoding process, and generating the corresponding reference frame based thereon.
e. Then, encoding MB according to the following steps for each MB:
  i. If the MB is an MB of the watermark region, it is handed over to the encoder for normal encoding.
  ii. If the MB is an MB in a non-watermark region, the processing steps are:
    1. Skipping a decision of a type of the MB, and reusing the type (Intra/Inter) of the corresponding MB extracted during the decoding process.
    2. Skipping an MB-level rate control, and reusing the QP of the corresponding MB extracted during the decoding process.
    3. Skipping a decision of a quadtree partition of MB, and reusing the partition scheme and type (Intra/Inter) of the corresponding MB extracted during the decoding process.
    4. Skipping a decision of intra mode for intra MB and its sub_MB, and reusing the intra mode of sub_MB of the corresponding MB extracted during the decoding process.
    5. Skipping a decision of a mode for inter MB and reusing the mode of the corresponding MB extracted during the decoding process.
    6. Skipping a decision for selecting reference frame for inter MB and reusing the reference frame of the corresponding MB extracted during the decoding process.
    7. Skipping an MV searching process for inter MB and its sub_MB, and reusing the MV of the corresponding MB and its sub_MB extracted during the decoding process.
    In addition, because the gray mask is known beforehand, the MV in the encoding may be used for detecting whether there is a significant change between the gray mask of the current block and the gray mask of the reference block, e.g., by calculating the sum of absolute differences (SAD) between the current block and the reference block to measure the amount of change. If the change is significant, further optimization may be performed on the existing MV, such as by searching for a motion vector in the vicinity of the starting point of the MV, so as to improve prediction efficiency.
    8. Due to the case where the non-uniform gray mask is added to adjust the brightness of the picture, if CBF is reused at this time, the brightness of the picture will appear mottled, and the subjective quality deteriorates. Therefore, in order to prevent this situation from occurring, CBF is not reused.
  iii. If the MB is an MB in a region adjacent to the watermark, the MB is processed according to the following steps:
    1. Skipping a decision of a type of the MB, and reusing the type (Intra/Inter) of the corresponding MB extracted during the decoding process.
    2. Skipping an MB-level rate control, and reusing the QP of the corresponding MB extracted during the decoding process.
    3. Skipping a decision of a quadtree partition of MB, and reusing the partition scheme and type (Intra/Inter) of the corresponding MB extracted during the decoding process.
    4. Skipping a decision of intra mode for intra MB and its sub_MB, and reusing the intra mode of sub_MB of the corresponding MB extracted during the decoding process.
    5. Uniformly processing the skip mode and the direct mode according to the inter mode, and CBF is not reused.
    6. Skipping a decision for selecting a reference frame for inter MB and reusing the reference frame of the corresponding MB extracted during the decoding process.
    7. Skipping an MV searching process for inter MB and its sub_MB, and reusing the MV of the corresponding MB and its sub_MB extracted during the decoding process.
  iv. In addition, for scenarios with higher requirements for transcoding quality, the following optimizations may be made:
    1. When reusing the intra mode, if this mode is an angle mode, a small-scale refinement around the mode may be made.
    2. The cost of reusing the MV is calculated. If the cost is greater than a specified threshold, a small-scale search around the MV is made to optimize this MV.
    3. If the MV of the corresponding MB and its sub_MB extracted during the decoding process points to the watermark region, the cost of encoding this block with intra mode is calculated and a method (inter/intra) with less cost is selected.
3. Entropy encoding is performed, and watermarked H.264 bitstream is generated. The entropy encoding scheme may be selected voluntarily from CAVLC/CABAC.

V. Extension

1. The embodiments of the present disclosure are applicable to scenarios where multiple watermarks are inserted or mosaic (covering one or more regions) is added.
2. The embodiments of the present disclosure are applicable to transcoding scenarios where image quality is enhanced at the same resolution.
3. The embodiments of the present disclosure may be used for other video coding standards such as HEVC, VVC, VP-8, and AV1, etc.
4. The embodiments of the present disclosure may also be used for variable bitrate transcoding, canceling the reusing of QP and CBF, and adjusting QP based on the target bitrate.

Figure 11:
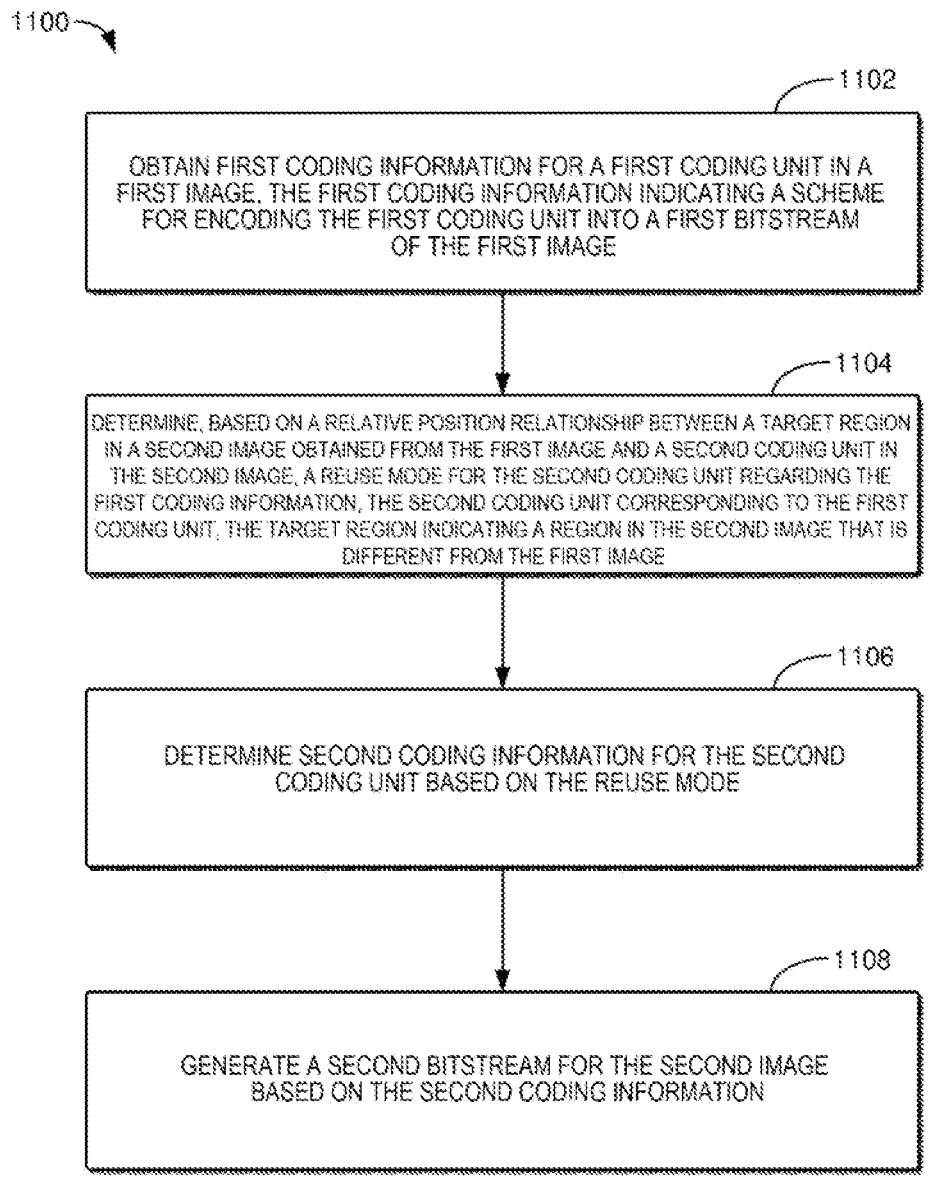
FIG. 11 illustrates a flowchart of a method for image encoding according to some embodiments of the present disclosure.

Methods according to various embodiments of the present disclosure will be further described in combination with FIG. 11 hereinafter. FIG. 11 illustrates a flowchart of a method 1100 for image encoding according to some embodiments of the present disclosure. The method 1100 comprises: obtaining 1102 first coding information for a first coding unit in a first image, the first coding information indicating a scheme for encoding the first coding unit into a first bitstream of the first image. The method 1100 further comprises: determining 1104, based on a relative position relationship between a target region in a second image obtained from the first image and a second coding unit in the second image, a reuse mode for the second coding unit regarding the first coding information, the second coding unit corresponding to the first coding unit, the target region indicating a region in the second image that is different from the first image. Moreover, the method 1100 further comprises: determining second coding information for the second coding unit based on the reuse mode; and generating a second bitstream for the second image based on the second coding information.

According to the method of the embodiments of the present disclosure, when transcoding a locally edited image, the reuse mode for the coding unit regarding the original coding information is determined based on the relative position relationship between the coding unit and the edited region, thereby the edited image is encoded based on the reuse of the original coding information. In this way, compared with the known conventional methods, the computational complexity of transcoding can be effectively reduced and a degradation of coding performance and coding quality can be avoided.

In some embodiments, the target region may indicate that, compared with the first image, the second image is added with a watermark region. In some embodiments, the target region may indicate that, compared with the first image, the second image is added with a mosaic region. In some embodiments, the target region may indicate that, compared with the first image, the second image is added with a gray mask region. In some embodiments, the target region may indicate that, compared with the first image, the second image is added with a watermark region, a mosaic region, and/or a gray mask region. It should be understood that, compared with the first image, the second image may also be edited in any other suitable manner, and the scope of this disclosure is not limited in this regard.

In some embodiments, determining the reuse mode may comprise: if the second coding unit is adjacent to the target region, determining that the first coding information is partially reused for the second coding information. For example, an electronic device may determine whether the second coding unit is adjacent to the target region based on bounding boxes indicated by coordinates of the second coding unit and the target region.

In some embodiments, determining the reuse mode comprises: if the second coding unit is spaced apart from the target region, determining the reuse mode based on motion information of the second coding unit. For example, an electronic device may determine whether the second coding unit is spaced apart from the target region based on the bounding boxes indicated by coordinates of the second coding unit and the target region.

In some embodiments, the motion information of the second coding unit indicates a reference coding unit in a reference image, and determining the reuse mode based on the motion information of the second coding unit comprises: if the reference coding unit at least partially overlaps with an edited region in the reference image, determining that the first coding information is partially reused for the second coding information. For example, if the reference block in the reference frame indicated by the motion vector of the second coding unit is located in the watermark part of the reference frame, the electronic device may determine that the first coding information is partially reused for the second coding information.

In some embodiments, motion information of a pixel in the second coding unit indicates a reference coding unit in a reference image, and determining the reuse mode based on the motion information of the second coding unit comprises: if the reference coding unit at least partially overlaps with an edited region in the reference image, determining that the first coding information is partially reused for the second coding information.

In some embodiments, the reuse mode indicates that the first coding information is partially reused for the second coding information, and determining the second coding information comprises: reusing, for the second coding information, at least one in a reusable information set of the first coding information. The reusable information set comprises a prediction mode, a block partition, and a quantization parameter.

In some embodiments, determining the second coding information comprises: determining, based on the second coding unit, at least one of motion information or residual information for the second coding unit. For example, the electronic device does not reuse the motion information and residual information in the first coding information, but instead redetermines the motion information and residual information for the second coding unit based on the second coding unit.

In some embodiments, motion information of the second coding unit indicates a reference coding unit in a reference image, and determining the second coding information further comprises: obtaining a motion vector for the second coding unit by performing motion estimation on the second coding unit; and if the motion vector for the second coding unit is the same as a motion vector for the first coding unit, the first coding information indicates that the first coding unit is encoded into the first bitstream based on a skip mode, and the reference coding unit at least partially overlaps with an edited region in the reference image, setting a coding mode for the second coding unit to a direct mode or a merge mode. Thereby, residual information for the second coding unit may be recalculated, so as to ensure the encoding quality.

In some embodiments, motion information of the second coding unit indicates a reference coding unit in a reference image, and determining the second coding information further comprises: obtaining a motion vector for the second coding unit by performing motion estimation on the second coding unit; and if the motion vector for the second coding unit is different from a motion vector for the first coding unit, the first coding information indicates that the first coding unit is encoded into the first bitstream based on a skip mode, and the reference coding unit at least partially overlaps with an edited region in the reference image, setting a coding mode for the second coding unit to an advanced motion vector prediction (AMVP) mode. Thereby, residual information for the second coding unit may be recalculated, so as to ensure the encoding quality.

In some embodiments, determining the second coding information further comprises: determining, based on the second coding unit, at least one of a motion vector difference (MVD) or an AMVP candidate index for the second coding unit.

In some embodiments, a coding block flag (CBF) for the second coding unit is set to 1, and determining the second coding information further comprises: determining a residual coefficient for the second coding unit based on the motion vector for the second coding unit.

In some embodiments, the reuse mode indicates that the first coding information is partially reused for the second coding information, and determining the second coding information comprises: reusing, for the second coding information, at least one in a reusable information set of the first coding information. The reusable information set comprises a prediction mode, a block partition, a quantization parameter, and a motion vector.

In some embodiments, determining the second coding information further comprises: determining an MVD for the second coding unit based on a motion vector for the first coding unit.

In some embodiments, determining the second coding information further comprises: if the first coding information indicates that the first coding unit is encoded into the first bitstream based on a skip mode or a direct mode, setting a coding mode for the second coding unit to an AMVP mode.

In some embodiments, determining the second coding information further comprises: determining an MVD for the second coding unit based on a motion vector and a motion vector prediction (MVP) for the second coding unit.

In some embodiments, the reuse mode indicates that the first coding information is partially reused for the second coding information, and determining the second coding information comprises: reusing, for the second coding information, at least one in a reusable information set of the first coding information. The reusable information set comprises a prediction mode, a block partition, a quantization parameter, a motion vector, a coding mode and motion information.

In some embodiments, the motion information for the second coding unit indicates a reference coding unit, and determining the second coding information further comprises: determining residual information for the second coding unit based on the second coding unit and the reference coding unit.

In some embodiments, determining the reuse mode comprises: if the second coding unit is adjacent to the target region, and the first coding unit is encoded into the first bitstream based on an intra prediction mode, determining that the first coding information is partially reused for the second coding information.

In some embodiments, determining the reuse mode comprises: if the second coding unit is in the target region, determining that the first coding information is not reused for the second coding information.

In some embodiments, motion information of a pixel in the second coding unit indicates a reference coding unit in a reference image, and determining the reuse mode comprises: if the reference coding unit is in an edited region of the reference image, determining that the first coding information is not reused for the second coding information.

In some embodiments, determining the reuse mode comprises: if the second coding unit is spaced apart from the target region, determining that the first coding information is fully reused for the second coding information.

Implementations of the present disclosure can also be described in view of the following clauses, the features of which can be combined in any reasonable manner.

Clause 1. A method for image encoding, comprising:
obtaining first coding information for a first coding unit in a first image, the first coding information indicating a scheme for encoding the first coding unit into a first bitstream of the first image;
determining, based on a relative position relationship between a target region in a second image obtained from the first image and a second coding unit in the second image, a reuse mode for the second coding unit regarding the first coding information, the second coding unit corresponding to the first coding unit, the target region indicating a region in the second image that is different from the first image;
determining second coding information for the second coding unit based on the reuse mode; and
generating a second bitstream for the second image based on the second coding information.

Clause 2. The method of Clause 1, wherein determining the reuse mode comprises:
if the second coding unit is adjacent to the target region, determining that the first coding information is partially reused for the second coding information.

Clause 3. The method of Clause 1 or 2, wherein determining the reuse mode comprises:
if the second coding unit is spaced apart from the target region, determining the reuse mode based on motion information of the second coding unit.

Clause 4. The method of Clause 3, wherein the motion information of the second coding unit indicates a reference coding unit in a reference image, and determining the reuse mode based on the motion information of the second coding unit comprises:
if the reference coding unit at least partially overlaps with an edited region in the reference image, determining that the first coding information is partially reused for the second coding information.

Clause 5. The method of Clause 3, wherein motion information of a pixel in the second coding unit indicates a reference coding unit in a reference image, and determining the reuse mode based on the motion information of the second coding unit comprises:
if the reference coding unit at least partially overlaps with an edited region in the reference image, determining that the first coding information is partially reused for the second coding information.

Clause 6. The method of any of Clauses 1-5, wherein the reuse mode indicates that the first coding information is partially reused for the second coding information, and determining the second coding information comprises:
reusing, for the second coding information, at least one in a reusable information set of the first coding information, the reusable information set comprising a prediction mode, a block partition, and a quantization parameter.

Clause 7. The method of any of Clauses 1-5, wherein determining the second coding information comprises:
determining, based on the second coding unit, at least one of motion information or residual information for the second coding unit.

Clause 8. The method of Clause 6 or 7, wherein motion information of the second coding unit indicates a reference coding unit in a reference image, and determining the second coding information further comprises:
obtaining a motion vector for the second coding unit by performing motion estimation on the second coding unit; and
if the motion vector for the second coding unit is the same as a motion vector for the first coding unit, the first coding information indicates that the first coding unit is encoded into the first bitstream based on a skip mode, and the reference coding unit at least partially overlaps with an edited region in the reference image, setting a coding mode for the second coding unit to a direct mode or a merge mode.

Clause 9. The method of any of Clauses 6-8, wherein motion information of the second coding unit indicates a reference coding unit in a reference image, and determining the second coding information further comprises:

obtaining a motion vector for the second coding unit by performing motion estimation on the second coding unit; and if the motion vector for the second coding unit is different from a motion vector for the first coding unit, the first coding information indicates that the first coding unit is encoded into the first bitstream based on a skip mode, and the reference coding unit at least partially overlaps with an edited region in the reference image, setting a coding mode for the second coding unit to an advanced motion vector prediction (AMVP) mode.

Clause 10. The method of Clause 9, wherein determining the second coding information further comprises:

determining, based on the second coding unit, at least one of a motion vector difference (MVD) or an AMVP candidate index for the second coding unit.

Clause 11. The method of any of Clauses 8-10, wherein a coding block flag (CBF) for the second coding unit is set to 1, and determining the second coding information further comprises:

determining a residual coefficient for the second coding unit based on the motion vector for the second coding unit.

Clause 12. The method of Clause 6, wherein the reusable information set further comprises a motion vector.

Clause 13. The method of Clause 12, wherein determining the second coding information further comprises:

determining an MVD for the second coding unit based on a motion vector for the first coding unit.

Clause 14. The method of Clause 12 or 13, wherein determining the second coding information further comprises:

if the first coding information indicates that the first coding unit is encoded into the first bitstream based on a skip mode or a direct mode, setting a coding mode for the second coding unit to an AMVP mode.

Clause 15. The method of any of Clauses 12-14, wherein determining the second coding information further comprises:

determining an MVD for the second coding unit based on a motion vector and a motion vector prediction (MVP) for the second coding unit.

Clause 16. The method of Clause 12, wherein the reusable information set further comprises a coding mode and motion information.

Clause 17. The method of Clause 16, wherein the motion information for the second coding unit indicates a reference coding unit, and determining the second coding information further comprises:

determining residual information for the second coding unit based on the second coding unit and the reference coding unit.

Clause 18. The method of Clause 1, wherein determining the reuse mode comprises:

if the second coding unit is adjacent to the target region, and the first coding unit is encoded into the first bitstream based on an intra prediction mode, determining that the first coding information is partially reused for the second coding information.

Clause 19. The method of any of Clauses 1-18, wherein determining the reuse mode comprises:

if the second coding unit is in the target region, determining that the first coding information is not reused for the second coding information.

Clause 20. The method of any of Clauses 1-3, wherein motion information of a pixel in the second coding unit indicates a reference coding unit in a reference image, and determining the reuse mode comprises:

if the reference coding unit is in an edited region of the reference image, determining that the first coding information is not reused for the second coding information.

Clause 21. The method of Clause 1 or 2, wherein determining the reuse mode comprises:

if the second coding unit is spaced apart from the target region, determining that the first coding information is fully reused for the second coding information.

Clause 22. The method of any of Clauses 1-21, wherein the target region indicates that, compared with the first image, the second image is added with at least one of the following regions: a watermark region, a mosaic region, or a gray mask region.

Clause 23. An electronic device, comprising:
a processor; and
a memory coupled to the processor and having instructions stored thereon which, when executed by the processor, cause the electronic device to perform a method in accordance with any of Clauses 1-22.

Clause 24. A non-transitory computer-readable storage medium storing instructions that cause a processor to perform a method in accordance with any of Clauses 1-22.

Clause 25. A non-transitory computer-readable recording medium storing a bitstream of a video, wherein the bitstream of the video is generated by a method in accordance with any of Clauses 1-22, wherein the method is performed by a video processing apparatus.

Example Device

Figure 12:
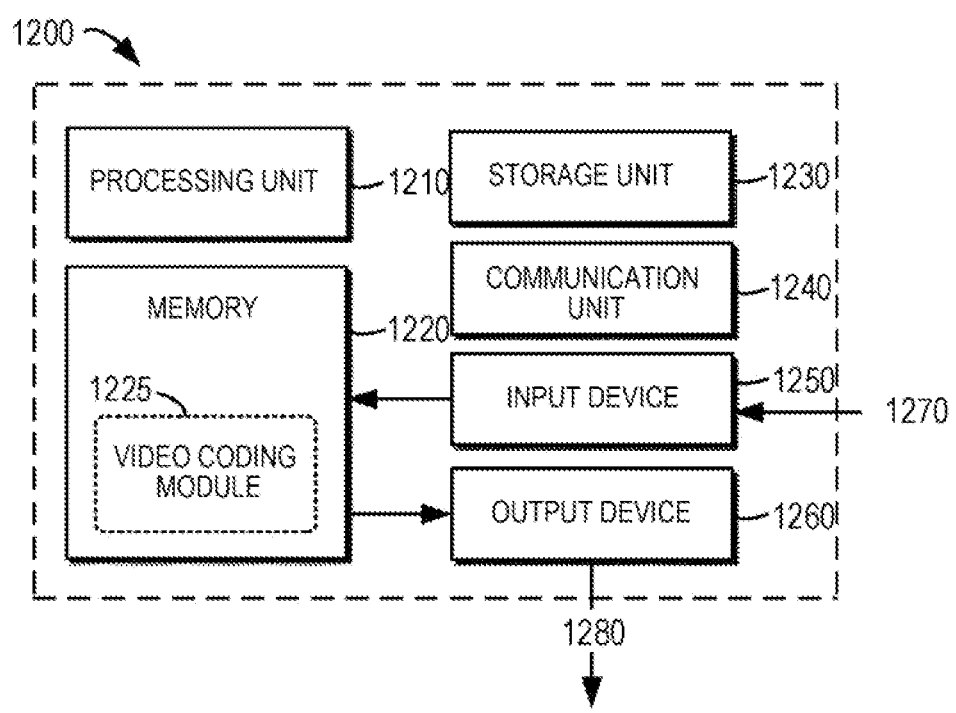
FIG. 12 illustrates a block diagram of a computing device in which various embodiments of the present disclosure can be implemented.

FIG. 12 illustrates a block diagram of a computing device 1200 in which various embodiments of the present disclosure can be implemented. The computing device 1200 may be implemented as or included in the source device 110 (or the video encoder 114 or 200) or the destination device 120 (or the video decoder 124 or 300).

It would be appreciated that the computing device 1200 shown in FIG. 12 is merely for purpose of illustration, without suggesting any limitation to the functions and scopes of the embodiments of the present disclosure in any manner.

As shown in FIG. 12, the computing device 1200 includes a general-purpose computing device 1200. The computing device 1200 may at least comprise one or more processors or processing units 1210, a memory 1220, a storage unit 1230, one or more communication units 1240, one or more input devices 1250, and one or more output devices 1260.

In some embodiments, the computing device 1200 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1200 can support any type of interface to a user (such as "wearable" circuitry and the like).

The processing unit 1210 may be a physical or virtual processor and can implement various processes based on programs stored in the memory 1220. In a multi-processor system, multiple processing units execute computer executable instructions in parallel so as to improve the parallel processing capability of the computing device 1200. The processing unit 1210 may also be referred to as a central processing unit (CPU), a microprocessor, a controller or a microcontroller.

The computing device 1200 typically includes various computer storage medium. Such medium can be any medium accessible by the computing device 1200, including, but not limited to, volatile and non-volatile medium, or detachable and non-detachable medium. The memory 1220 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1230 may be any detachable or non-detachable medium and may include a machine-readable medium such as a memory, flash memory drive, magnetic disk or another other media, which can be used for storing information and/or data and can be accessed in the computing device 1200.

The computing device 1200 may further include additional detachable/non-detachable, volatile/non-volatile memory medium. Although not shown in FIG. 12, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1240 communicates with a further computing device via the communication medium. In addition, the functions of the components in the computing device 1200 can be implemented by a single computing cluster or multiple computing machines that can communicate via communication connections. Therefore, the computing device 1200 can operate in a networked environment using a logical connection with one or more other servers, networked personal computers (PCs) or further general network nodes.

The input device 1250 may be one or more of a variety of input devices, such as a mouse, keyboard, tracking ball, voice-input device, and the like. The output device 1260 may be one or more of a variety of output devices, such as a display, loudspeaker, printer, and the like. By means of the communication unit 1240, the computing device 1200 can further communicate with one or more external devices (not shown) such as the storage devices and display device, with one or more devices enabling the user to interact with the computing device 1200, or any devices (such as a network card, a modem and the like) enabling the computing device 1200 to communicate with one or more other computing devices, if required. Such communication can be performed via input/output (I/O) interfaces (not shown).

In some embodiments, instead of being integrated in a single device, some or all components of the computing device 1200 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical positions or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at positions in a remote data center. Cloud computing infrastructures may provide the services through a shared data center, though they behave as a single access point for the users. Therefore, the cloud computing architectures may be used to provide the components and functionalities described herein from a service provider at a remote position. Alternatively, they may be provided from a conventional server or installed directly or otherwise on a client device.

The computing device 1200 may be used to implement video encoding/decoding in embodiments of the present disclosure. The memory 1220 may include one or more video coding modules 1225 having one or more program instructions. These modules are accessible and executable by the processing unit 1210 to perform the functionalities of the various embodiments described herein.

In the example embodiments of performing video encoding, the input device 1250 may receive video data as an input 1270 to be encoded. The video data may be processed, for example, by the video coding module 1225, to generate an encoded bitstream. The encoded bitstream may be provided via the output device 1260 as an output 1280.

In the example embodiments of performing video decoding, the input device 1250 may receive an encoded bitstream as the input 1270. The encoded bitstream may be processed, for example, by the video coding module 1225, to generate decoded video data. The decoded video data may be provided via the output device 1260 as the output 1280.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for image encoding, comprising:
   obtaining first coding information for a first coding unit in a first image, the first coding information indicating a scheme for encoding the first coding unit into a first bitstream of the first image;
   determining, based on a relative position relationship between a target region in a second image obtained from the first image and a second coding unit in the second image, a reuse mode for the second coding unit regarding the first coding information, the second coding unit corresponding to the first coding unit, the target region indicating a region in the second image that is different from the first image;
   determining second coding information for the second coding unit based on the reuse mode; and
   generating a second bitstream for the second image based on the second coding information.

2. The method of claim 1, wherein determining the reuse mode comprises:
  if the second coding unit is adjacent to the target region, determining that the first coding information is partially reused for the second coding information, or
  if the second coding unit is spaced apart from the target region, determining the reuse mode based on motion information of the second coding unit, or
  if the second coding unit is in the target region, determining that the first coding information is not reused for the second coding information.

3. The method of claim 2, wherein the motion information of the second coding unit indicates a reference coding unit in a reference image, and determining the reuse mode based on the motion information of the second coding unit comprises:
  if the reference coding unit at least partially overlaps with an edited region in the reference image, determining that the first coding information is partially reused for the second coding information.

4. The method of claim 2, wherein motion information of a pixel in the second coding unit indicates a reference coding unit in a reference image, and determining the reuse mode based on the motion information of the second coding unit comprises:
  if the reference coding unit at least partially overlaps with an edited region in the reference image, determining that the first coding information is partially reused for the second coding information.

5. The method of claim 1, wherein the reuse mode indicates that the first coding information is partially reused for the second coding information, and determining the second coding information comprises:
  reusing, for the second coding information, at least one in a reusable information set of the first coding information, the reusable information set comprising a prediction mode, a block partition, and a quantization parameter.

6. The method of claim 1, wherein determining the second coding information comprises:
  determining, based on the second coding unit, at least one of motion information or residual information for the second coding unit.

7. The method of claim 5, wherein motion information of the second coding unit indicates a reference coding unit in a reference image, and determining the second coding information further comprises:
  obtaining a motion vector for the second coding unit by performing motion estimation on the second coding unit; and
  if the motion vector for the second coding unit is the same as a motion vector for the first coding unit, the first coding information indicates that the first coding unit is encoded into the first bitstream based on a skip mode, and the reference coding unit at least partially overlaps with an edited region in the reference image, setting a coding mode for the second coding unit to a direct mode or a merge mode, or
  if the motion vector for the second coding unit is different from a motion vector for the first coding unit, the first coding information indicates that the first coding unit is encoded into the first bitstream based on a skip mode, and the reference coding unit at least partially overlaps with an edited region in the reference image, setting a coding mode for the second coding unit to an advanced motion vector prediction (AMVP) mode.

8. The method of claim 7, wherein determining the second coding information further comprises:
  determining, based on the second coding unit, at least one of a motion vector difference (MVD) or an AMVP candidate index for the second coding unit.

9. The method of claim 7, wherein a coding block flag (CBF) for the second coding unit is set to 1, and determining the second coding information further comprises:
  determining a residual coefficient for the second coding unit based on the motion vector for the second coding unit.

10. The method of claim 5, wherein the reusable information set further comprises a motion vector.

11. The method of claim 10, wherein determining the second coding information further comprises:
  determining an MVD for the second coding unit based on a motion vector for the first coding unit.

12. The method of claim 10, wherein determining the second coding information further comprises at least one of the following:
  if the first coding information indicates that the first coding unit is encoded into the first bitstream based on a skip mode or a direct mode, setting a coding mode for the second coding unit to an AMVP mode, or
  determining an MVD for the second coding unit based on a motion vector and a motion vector prediction (MVP) for the second coding unit.

13. The method of claim 10, wherein the reusable information set further comprises a coding mode and motion information.

14. The method of claim 13, wherein the motion information for the second coding unit indicates a reference coding unit, and determining the second coding information further comprises:
  determining residual information for the second coding unit based on the second coding unit and the reference coding unit.

15. The method of claim 1, wherein determining the reuse mode comprises:
  if the second coding unit is adjacent to the target region, and the first coding unit is encoded into the first bitstream based on an intra prediction mode, determining that the first coding information is partially reused for the second coding information.

16. The method of claim 1, wherein motion information of a pixel in the second coding unit indicates a reference coding unit in a reference image, and determining the reuse mode comprises:
  if the reference coding unit is in an edited region of the reference image, determining that the first coding information is not reused for the second coding information.

17. The method of claim 1, wherein determining the reuse mode comprises:
  if the second coding unit is spaced apart from the target region, determining that the first coding information is fully reused for the second coding information.

18. The method of claim 1, wherein the target region indicates that, compared with the first image, the second image is added with at least one of the following regions: a watermark region, a mosaic region, or a gray mask region.

19. An electronic device, comprising:
  a processor; and
  a memory coupled to the processor and having instructions stored thereon which, when executed by the processor, cause the electronic device to perform a method comprising:

obtaining first coding information for a first coding unit in a first image, the first coding information indicating a scheme for encoding the first coding unit into a first bitstream of the first image;

determining, based on a relative position relationship between a target region in a second image obtained from the first image and a second coding unit in the second image, a reuse mode for the second coding unit regarding the first coding information, the second coding unit corresponding to the first coding unit, the target region indicating a region in the second image that is different from the first image;

determining second coding information for the second coding unit based on the reuse mode; and generating a second bitstream for the second image based on the second coding information.

20. A non-transitory computer-readable storage medium storing instructions that cause a processor to perform a method comprising:

obtaining first coding information for a first coding unit in a first image, the first coding information indicating a scheme for encoding the first coding unit into a first bitstream of the first image;

determining, based on a relative position relationship between a target region in a second image obtained from the first image and a second coding unit in the second image, a reuse mode for the second coding unit regarding the first coding information, the second coding unit corresponding to the first coding unit, the target region indicating a region in the second image that is different from the first image;

determining second coding information for the second coding unit based on the reuse mode; and generating a second bitstream for the second image based on the second coding information.

* * * * *